United States Patent
Maekawa et al.

(10) Patent No.: US 8,452,095 B2
(45) Date of Patent: May 28, 2013

(54) IMAGE PROCESSING FOR POST-PROCESSING RATE OF CHARACTER RECTANGLE EXTRACTION AND CHARACTER RECOGNITION ACCURACY

(75) Inventors: Koji Maekawa, Kawasaki (JP); Shigeo Fukuoka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 846 days.

(21) Appl. No.: 12/498,006

(22) Filed: Jul. 6, 2009

(65) Prior Publication Data

US 2010/0008587 A1    Jan. 14, 2010

(30) Foreign Application Priority Data

Jul. 8, 2008    (JP) ................................. 2008-177907

(51) Int. Cl.
*G06K 9/34* (2006.01)
*G06K 9/46* (2006.01)
*G06K 9/20* (2006.01)

(52) U.S. Cl.
USPC ............................ 382/176; 382/195; 382/282

(58) Field of Classification Search .................... 382/176
See application file for complete search history.

(56) References Cited

U.S. PATENT DOCUMENTS

| 4,251,799 | A | * | 2/1981 | Jih ................................. 382/174 |
| 5,930,393 | A | * | 7/1999 | Ho et al. ........................ 382/225 |
| 6,847,734 | B2 | * | 1/2005 | Hamamura ..................... 382/229 |
| 7,133,571 | B2 | * | 11/2006 | Cheatle ........................... 382/282 |
| 7,149,352 | B2 |  | 12/2006 | Fujiwara |
| 7,308,126 | B2 | * | 12/2007 | Rogers et al. .................. 382/132 |
| 2007/0263930 | A1 | * | 11/2007 | Ito ................................... 382/177 |
| 2008/0170785 | A1 | * | 7/2008 | Simmons et al. .............. 382/176 |

FOREIGN PATENT DOCUMENTS

| JP | 63-136181 A | 6/1988 |
| JP | 5-210761 A | 8/1993 |
| JP | 07-049926 A | 2/1995 |
| JP | 7-49926 A | 2/1995 |
| JP | 2002-015280 A | 1/2002 |
| JP | 2002-157550 A | 5/2002 |

OTHER PUBLICATIONS

JP 05-210761 English PAJ translation, Detailed Description section, pp. 1-5, translated Mar. 2012.*
JP 07-049926 English PAJ translation, Detailed Description section, pp. 1-16, translated Mar. 2012.*
JP 2002-157550 English PAJ translation, Detailed Description section, pp. 1-10, translated Mar. 2012.*
Office Action issued on Oct. 23, 2012, in counterpart Japanese application No. 2008-177907, 5 pages.

* cited by examiner

*Primary Examiner* — David Zarka
(74) *Attorney, Agent, or Firm* — Fitzpatrick, Cella, Harper & Scinto

(57) ABSTRACT

An image processing device is provided by the present invention, which includes a unit configured to acquire a pixel block contacting an enclosing border of a character rectangle extracted from an image, a determination unit configured to determine whether or not the acquired pixel block has a likelihood of noise, a unit configured to generate a noise candidate removed character rectangle by removing from the character rectangle the pixel block as to which it is determined to have the likelihood of noise, and an outputting unit configured to assess validities by performing character recognition for both of the noise candidate removed character rectangle and the character rectangle, and configured to output a recognition result for one of them having greater validity assessed.

4 Claims, 13 Drawing Sheets

BLACK PIXEL SEARCH 2 FOR CHARACTER
RECTANGLE INFORMATION α

JAPANESE KATAKANA CHARACTER WITH NOISE

DETECTED NOISE 2

UPDATE ENCLOSING RECTANGLE
INFORMATION 70 BY ADDING
INFORMATION ABOUT NOISE 2

|  | X COORDINATE | Y COORDINATE | RECTANGLE WIDTH | RECTANGLE HEIGHT | POSITION |
|---|---|---|---|---|---|
| NOISE 1 | Xn1 | Yn1 | Wn1 | Hn1 | LOWER |
| NOISE 2 | Xn2 | Yn2 | Wn2 | Hn2 | LOWER |

CHARACTER RECTANGLE COMPARISON INFORMATION

| RECTANGLE INFORMATION | RECOGNITION RESULT | RELIABILITY | CHARACTER WIDTH | CHARACTER HEIGHT | AVERAGE WIDTH | AVERAGE HEIGHT |
|---|---|---|---|---|---|---|
| CHARACTER RECTANGLE 1 | イ | 90 | 30 | 65 | 45 | 45 |
| CHARACTER RECTANGLE 2 | イ | 60 | 30 | 50 | 45 | 45 |
| CHARACTER RECTANGLE 3 | ノ | 90 | 30 | 40 | 45 | 45 |

→ JAPANESE KATAKANA CHARACTER

FIG.12

IMAGE PROCESSING FOR POST-PROCESSING RATE OF CHARACTER RECTANGLE EXTRACTION AND CHARACTER RECOGNITION ACCURACY

BACKGROUND OF THE INVENTION

1. Field of the Invention

The present invention relates to image processing. More specifically, it related to extracting characters by separating characters and noise from an image as preprocessing of a character recognition technique.

2. Description of Related Art

Conventionally, as a noise removing method from a character image, a method is known of removing noise by repeating expansion and reduction of an image, and a method of looking for an isolated point and removing the isolated point if it is decided so.

Japanese Patent Laid-Open No. H5-210761(1993) discloses a technique that makes, when the execution result of character recognition processing is not sufficient, projection in a lateral direction of a cut out pattern, identifies a noise portion from the projected image, and then performs the character recognition again after removing the noise portion from the cut out pattern.

A technique disclosed in Japanese Patent Laid-Open No. H7-49926(1995) performs discrimination processing on a cutout character image with a character cutout component, acquires a discrimination result and reliability of the discrimination, determine whether or not to output the discrimination result, performs, when making a decision of being unable to output, noise removal with a noise removing component, and executes the discrimination processing again. When the noise removing component performs noise removal, it detects isolated black pixels, and according to the size of detected isolated black pixels and the distance from other black pixels, it makes the isolated black pixels with high likelihood of noise a deletion target.

Japanese Patent Laid-Open No. 2002-157550 discloses a technique of deciding a reference value in accordance with the height of a line, cuts out characters after removing black pixel concatenations with a magnitude equal to or less than the reference value as noise, and performs character recognition of the cutout image.

On the other hand, unless an enclosing rectangle of a character is extracted correctly, it has a great influence on the character recognition accuracy. For example, as denoted by 1.1 in FIG. 1, it is likely that noise near a character is decided as an integral part thereof, and hence a character rectangle 12 is extracted which encloses a character image 10 of a Japanese katakana character or syllabic writing "ノ" and noise 11. In this case, character features for the character recognition are obtained from a feature region including border noise as denoted by 1.2.

A problem will arise when comparing the features obtained from the image including the noise of 1.2 of FIG. 1 with character features of a katakana character "ノ" which is denoted by 1.3 and stored in a character recognition dictionary and with character features of another Japanese katakana character or syllabic writing "イ" denoted by 1.4. According to the comparison, there are some cases of deciding that the features of the input image are closer to the features of the katakana character "イ". Thus, the katakana character "イ" is output as a recognition result.

Incidentally, although the Japanese example is shown in FIG. 1, such a problem is not limited to katakana of Japanese, but also occurs in alphabetical cases. For example as shown in FIG. 13, when noise 1302 is present near a character image 1301 of "o", there are some cases where a character rectangle 1303 is extracted. In this case, a character rectangle 1304 is divided into an n×m lattice (3×3, for example), and black pixel distribution in partial images passing through the division is obtained as character features. Then, when comparing the character features obtained with character features 1305 or 1306 stored in the character recognition dictionary, there are some cases where they are closer to the features 1306 of the character "q" rather than to the features 1305 of the character "o". If such a decision is made, the character "q" is erroneously output as a result of the recognition.

If detection of connected pixels and projection processing are performed with an entire character region image set as a processing target of an isolated point search when detecting isolated points from within an image, a problem of increasing a processing load and processing time arises.

An object of the present invention is to provide image processing capable of improving a postprocessing rate of the character rectangle extraction and of improving character recognition accuracy.

SUMMARY OF THE INVENTION

The present invention provides an image processing device which comprises a unit configured to acquire a pixel block contacting an enclosing border of a character rectangle extracted from an image, a determination unit configured to determine whether or not the acquired pixel block has a likelihood of noise, a unit configured to generate a noise candidate removed character rectangle by removing from the character rectangle the pixel block as to which it is determined to have the likelihood of noise, and an outputting unit configured to assess validities by performing character recognition for both of the noise candidate removed character rectangle and the character rectangle, and configured to output a recognition result for one of them having greater validity assessed.

Further features of the present invention will become apparent from the following description of exemplary embodiments (with reference to the attached drawings).

BRIEF DESCRIPTION OF THE DRAWINGS

FIG. 12 is a diagram showing character rectangle comparison information in the embodiment in accordance with the present invention.

DESCRIPTION OF THE EMBODIMENTS

Figure 1:
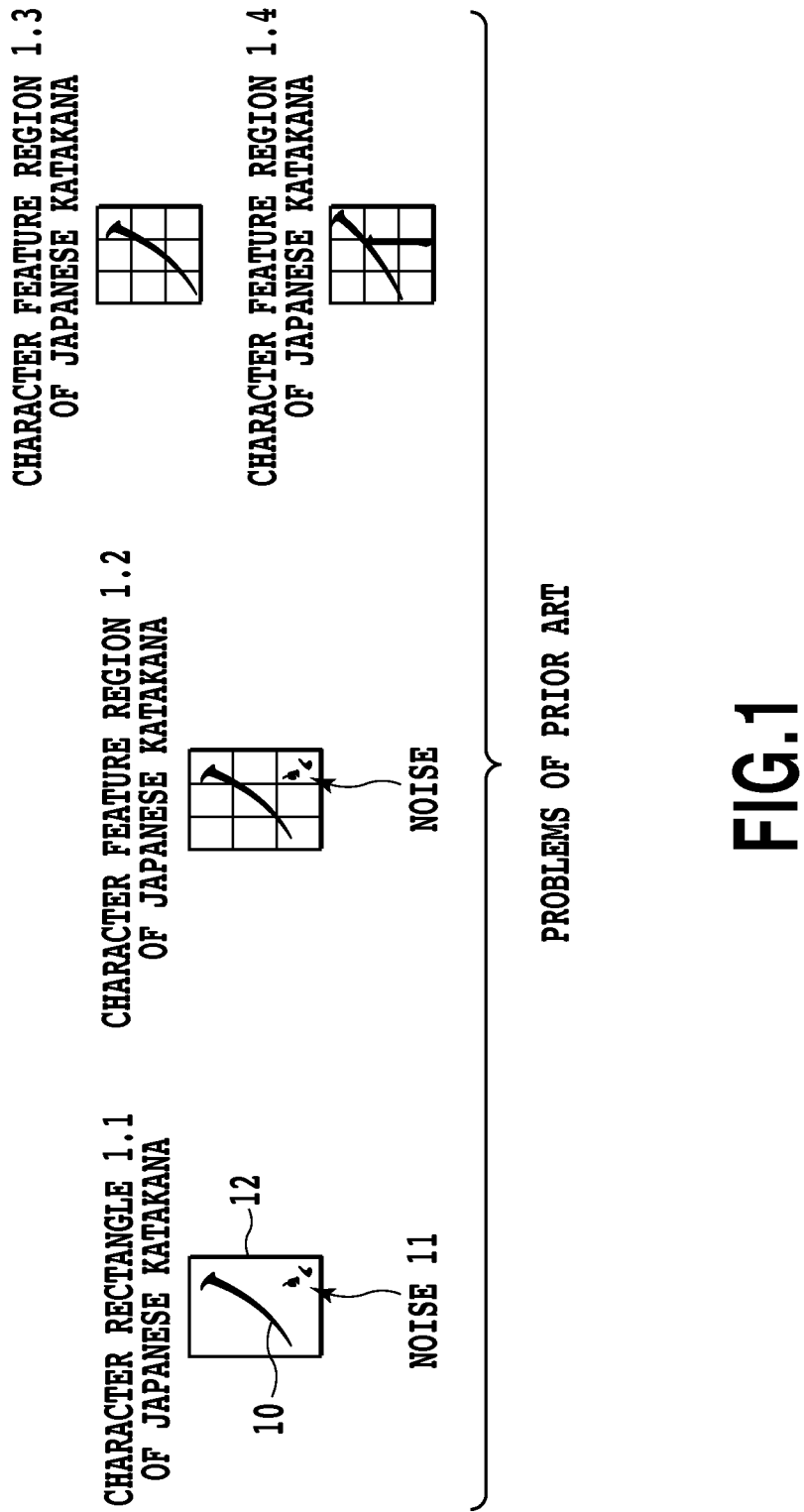
FIG. 1 is a diagram for explaining a problem in a conventional technique.
Figure 2:
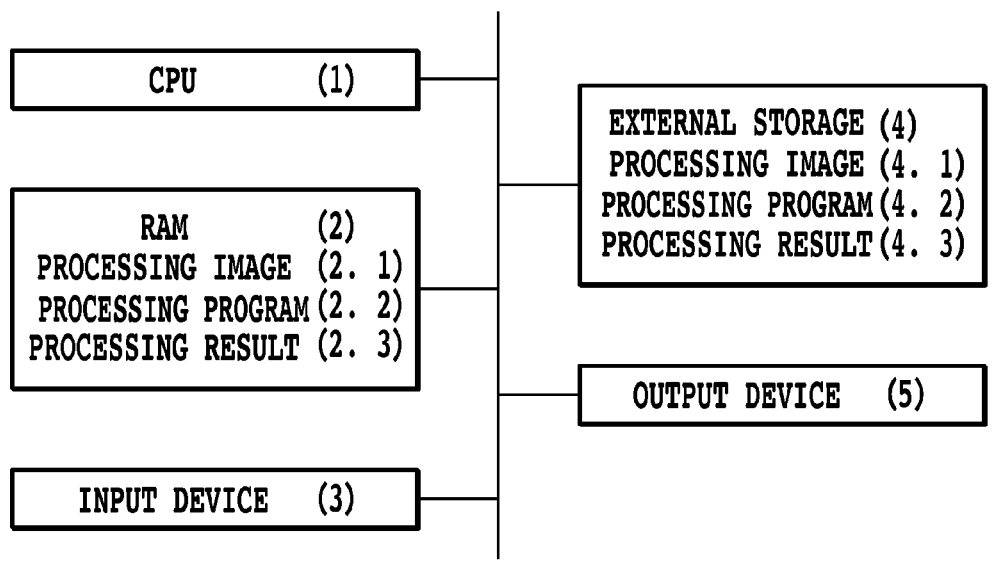
FIG. 2 is a diagram showing a configuration of an information processing (image processing) system for executing image processing in accordance with the present invention.

FIG. 2 is a diagram showing a configuration of an information processing (image processing) system necessary for implementing image processing in accordance with the present invention.

By inputting a processing image from an input device (3) such as a scanner or a processing image stored in an external storage device (4), and by executing a processing program (2.2) developed on a RAM (2) with a CPU (1), a processing result (2.3) is obtained. The processing result is stored in the output device (5) or external storage device (4.3) as the output. Thus, the processing program (2.2) causes a computer (CPU) to operate as a processing unit (individual processing components) for executing processing of individual steps of flowcharts which will be described later.

Figure 3:
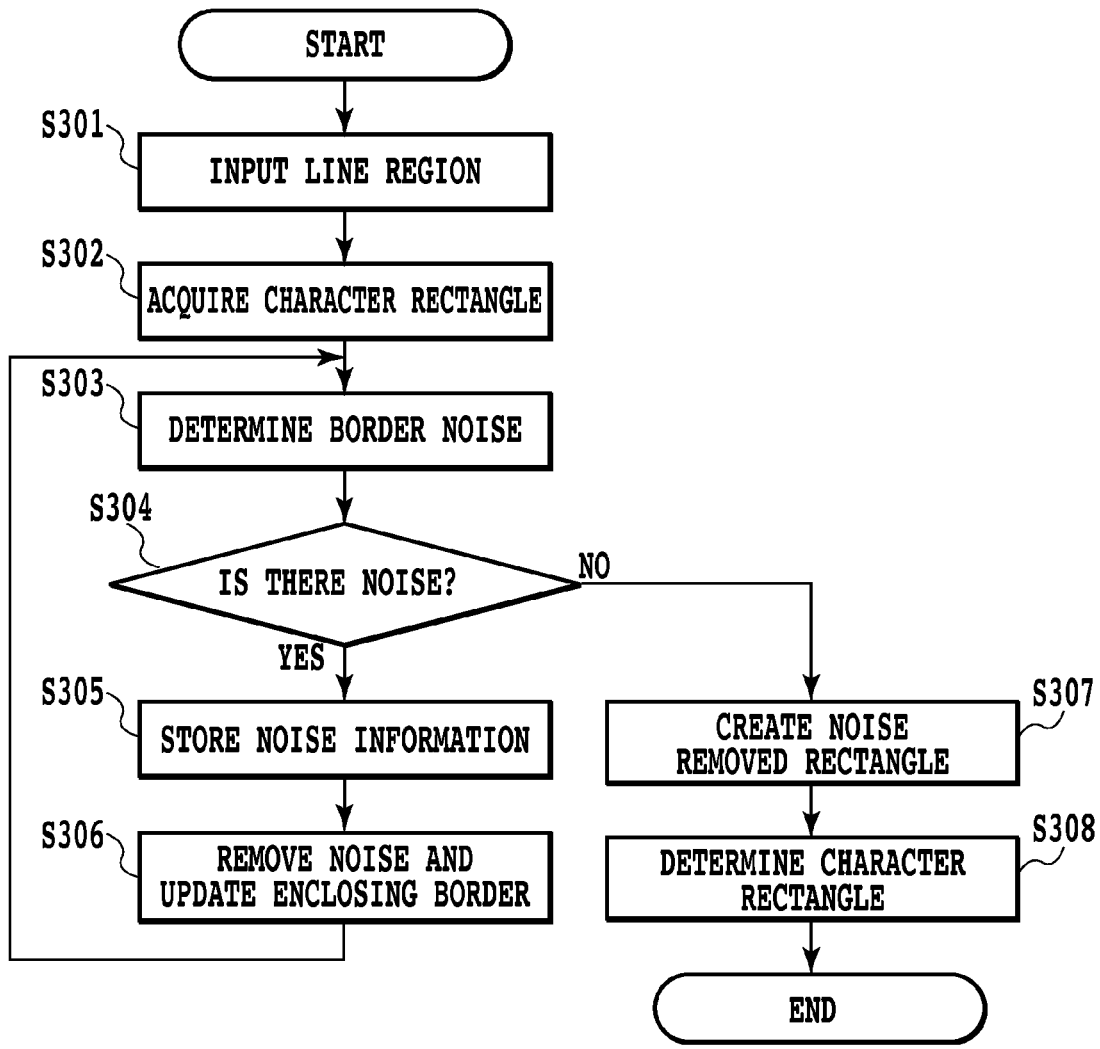
FIG. 3 is a flowchart showing a processing procedure in an embodiment in accordance with the present invention.

FIG. 3 is a flowchart showing a processing procedure of an embodiment in accordance with the present invention. Referring to the processing flow, the embodiment in accordance with the present invention will be described. Incidentally, although the following description will be made by way of example of Japanese character images, the present invention is not limited to Japanese, but the same processing can also be applied to alphabetical characters such as English.

Figure 4:
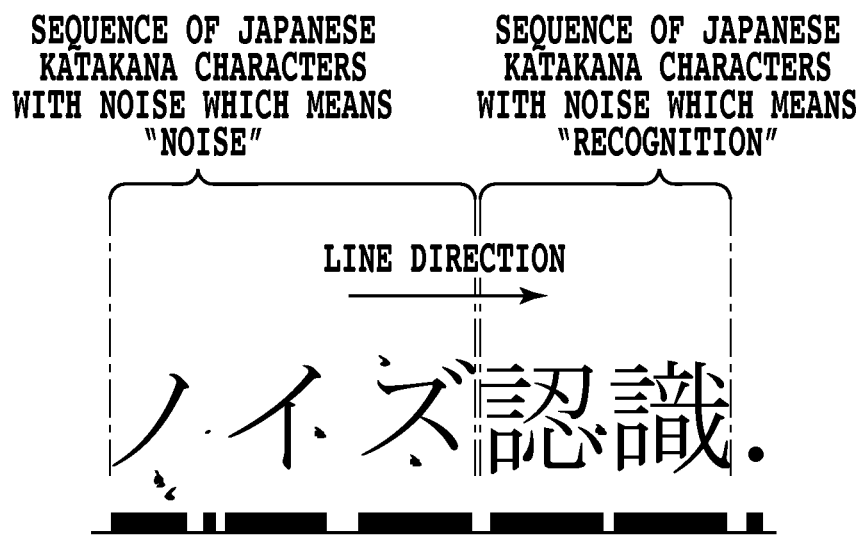
FIG. 4 is a diagram showing a line region image in the embodiment in accordance with the present invention.

At step S301, a line region, an example of which is shown in FIG. 4, is cut out and input as a processing image. The line region can be an image of character lines that are cut out in accordance with black pixel distribution positions of the projection in the line direction of a document image, for example. Preferably, the line region image is extracted by identifying a character region by performing publicly known region separation processing on the document image, first, and then by projecting the character region in the line direction. Incidentally, the term "projection in the line direction" refers to processing of making, when scanning individual pixel lines in the line direction (horizontal direction), a decision of black (1) as to pixel lines including one or more black pixels, and of white (0) as to pixel lines consisting of only white pixels.

At step S302, character rectangle regions (character regions) are extracted from the line region using projective information in the direction perpendicular to the line region. The term "vertical direction projection onto line region" refers to processing of making a decision as to whether each pixel column includes a black pixel or not by scanning each pixel column in the vertical direction in the line region.

Figure 6:
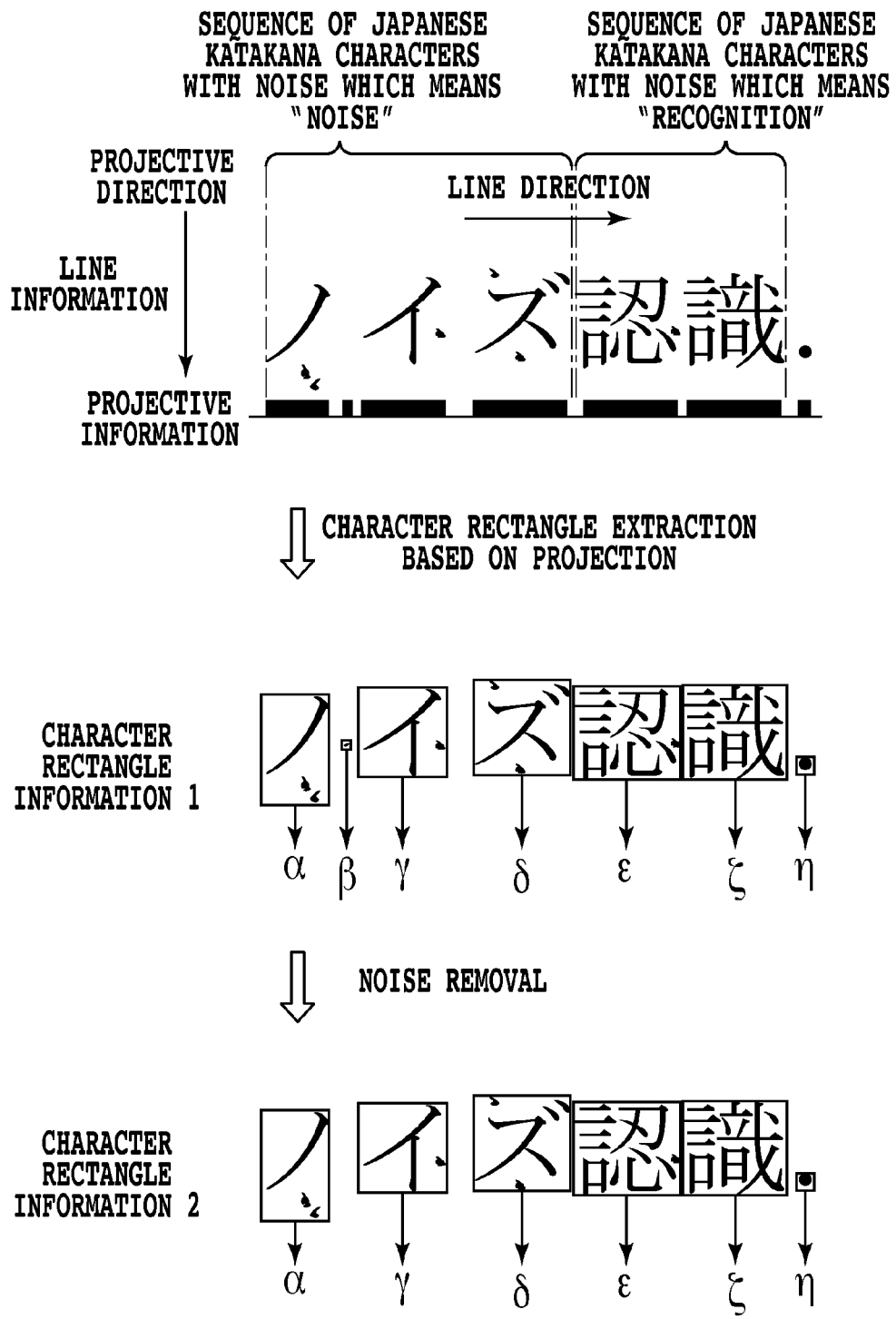
FIG. 6 is a diagram for explaining character rectangle extraction processing in the embodiment in accordance with the present invention.

As shown in FIG. 4 and FIG. 6, a projection is made in the direction perpendicular to the line direction to decide respective ranges in which black projections continue as character rectangle candidates, and the heights of the character rectangle candidates (regions enclosing black pixels constituting the sources of the projection) are extracted. Then, among the character rectangle candidates, those whose extracted heights are higher than a prescribed value are acquired as character rectangles. Thus, when the size of the character rectangle candidates extracted is not more than a threshold (height of four dots or less and width of four dots or less in the present embodiment), the character rectangles are removed as noise in advance.

In the example of FIG. 6, when the character rectangle candidates are extracted in accordance with the projection, character rectangle information 1 is obtained. From the character rectangle information 1, it is determined that the character rectangle β is 4×4 or less. Thus, it is deleted from the character rectangle information, and character rectangle information 2 is obtained in the end.

At step S303, noise at the borders of the character rectangles (border noise) is removed from the character rectangle information extracted at step S302 as follows.

Figure 5:
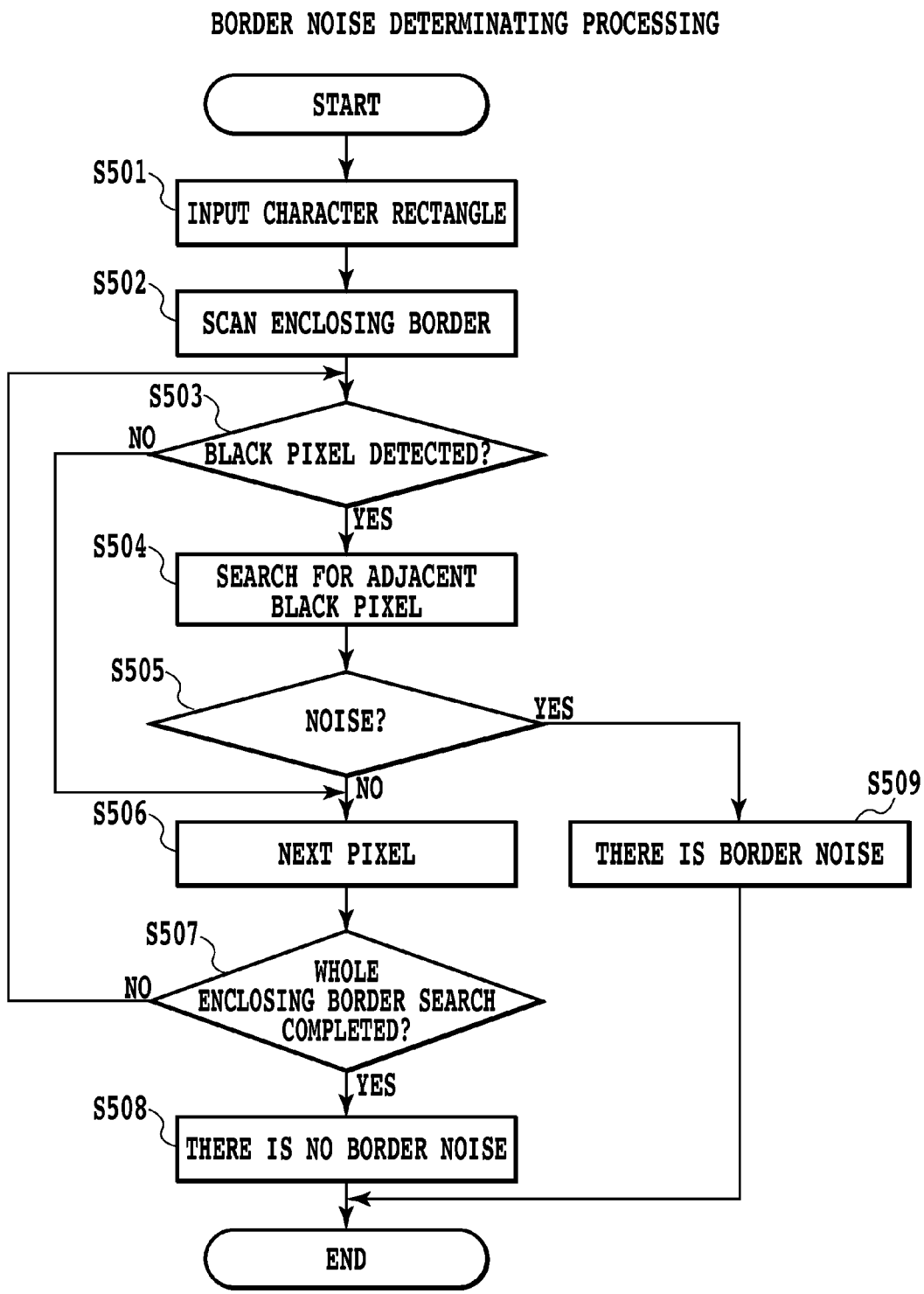
FIG. 5 is a flowchart showing a detailed processing procedure in border noise determination processing in the processing procedure of FIG. 3.

FIG. 5 is a flowchart showing details of a processing procedure in step S303 (border noise determination processing) of FIG. 3. Here, the border noise determination processing of FIG. 5 will be described by taking the character rectangle information α of FIG. 6 as an example.

At step S501, the character rectangle information α, which will become a processing target, is input to the border noise determination processing.

At step S502, black pixel detecting processing is performed by performing black pixel search concerning only the enclosing border of the character rectangle. More specifically, by scanning along the sides constituting the enclosing border, it is determined successively whether they are black pixels or not. In the processing 7.1 in the black pixel search shown in FIG. 7, black pixels are searched for successively along the enclosing border beginning from upper side of the enclosing border.

When it is determined at step S503 that a pixel on the enclosing border is a black pixel, the processing proceeds to step S504 to check whether the black pixel found has any adjacent black pixel or not.

Unless it is determined at step S503 that it is a black pixel, the processing proceeds to step S506 to move to the next pixel on the enclosing border as a check target.

At step S504, a black pixel concatenation (pixel block) is decided by tracing (contour tracing) a black pixel adjacent to the black pixel on the enclosing border. In this case, every time an adjacent black pixel is traced, the number of black pixels constituting the contour (length of a stroke constituting the contour (border)), the maximum position (Xmax) and the minimum position (Xmin) in the X direction, and the maximum position (Ymax) and the minimum position (Ymin) in the Y direction are updated. Every time they are updated, it is determined that the black pixel concatenation (pixel block) is not noise in the following three cases (No at step S505). More specifically, it is determined that it is not noise when one of the following conditions is fulfilled: when the number of black pixels constituting the contour is equal to or greater than the threshold; when the height (Ymax−Ymin) of the black pixels during the determination is greater than a threshold (thY) of the height; and when the width (Xmax−Xmin) is greater than a threshold (thX) of the width. It is also possible to make a noise determination by comparing the area of a pixel block composed of adjacent black pixels, which is calculated from the height and width of the black pixels during the determination, or the distance from other pixel blocks with a threshold.

On the other hand, if none of the foregoing conditions are satisfied, it is determined that the black pixel concatenation (pixel block) obtained in the contour tracing processing is likely to be noise (Yes at step S505), and the processing proceeds to step S509 to output the black pixel concatenation as noise information on the enclosing border.

Figure 7:
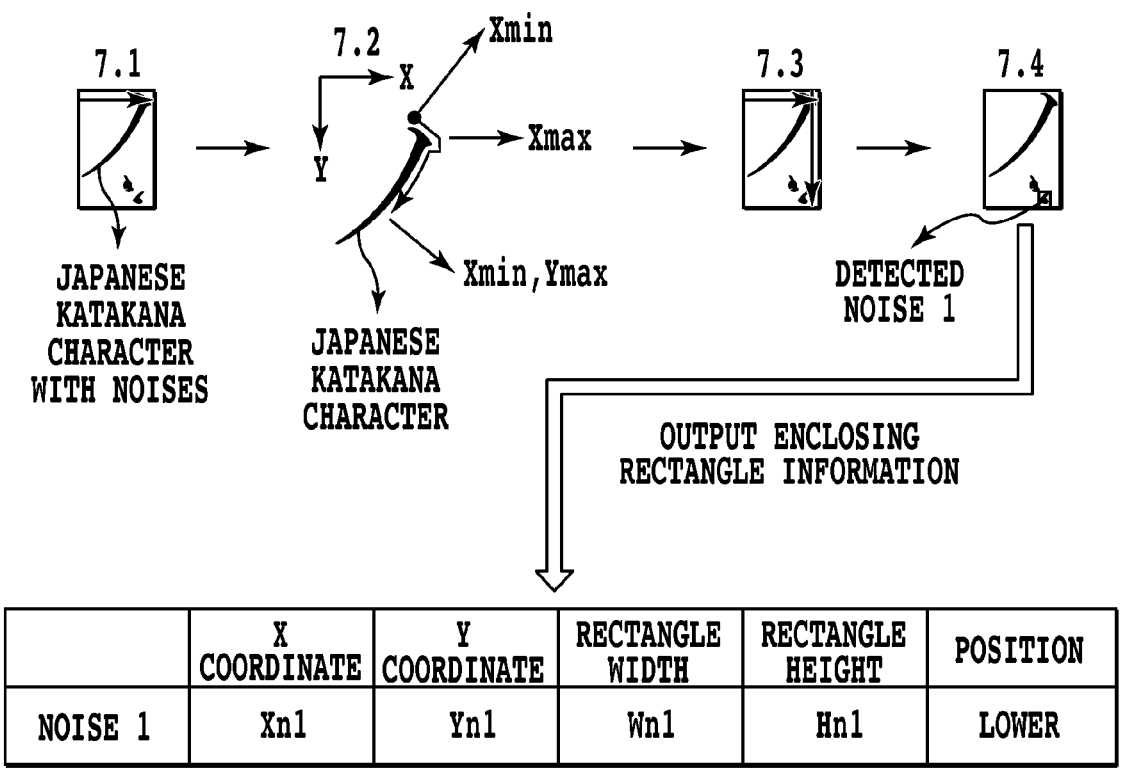
FIG. 7 is a diagram for explaining a black pixel search 1 about character rectangle information α in the character rectangle extraction processing of FIG. 6.

In the determination processing 7.2 of FIG. 7, since Ymax−Ymin>thY in the black pixel search (contour tracing processing) of black pixels found on the enclosing border upper side, it is determined that the pixel block under tracing is not noise.

When the above determination of being not noise is made, the processing moves at step S506 from the black pixel search start position to the next pixel on the enclosing border assigned as a detecting target.

At step S507, it is determined as to whether the enclosing border search has been completed or not, and returns to step S503 to continue the processing until the determination is completed. On the other hand, if it is determined that all the check has been completed as to the upper side, right side, lower side and left side of the enclosing border, the processing proceeds to step S508 and determined that no noise is present on the enclosing border.

In the processing examples 7.3 and 7.4 of FIG. 7, a black pixel is detected again during the lower side tracing, and noise 1 is detected as a result of performing contour line tracing (Yes at S505). Then, as rectangle information 70 about the detected noise 1, the X coordinate (Xn1), Y coordinate (Yn1), rectangle width (Wn1), rectangle height (Wh1), and the side (lower side) contacting the noise rectangle are output (step S509).

Subsequently, at step S304 of FIG. 3, it is determined by the border noise determination whether or not a rectangle region considered being noise is detected on the enclosing border.

The processing proceeds to step S305 to store rectangle information on the noise candidate when noise is detected on the enclosing border. Thus, it stores the noise information obtained at step S509.

In the present embodiment, since the rectangle information 70 (see FIG. 7) is output as to the noise 1 serving as the noise candidate, the rectangle information 70 is retained.

At step S306, the processing removes the noise rectangle, and generates the enclosing rectangle after noise removal (noise candidate removed character rectangle).

Figure 8:
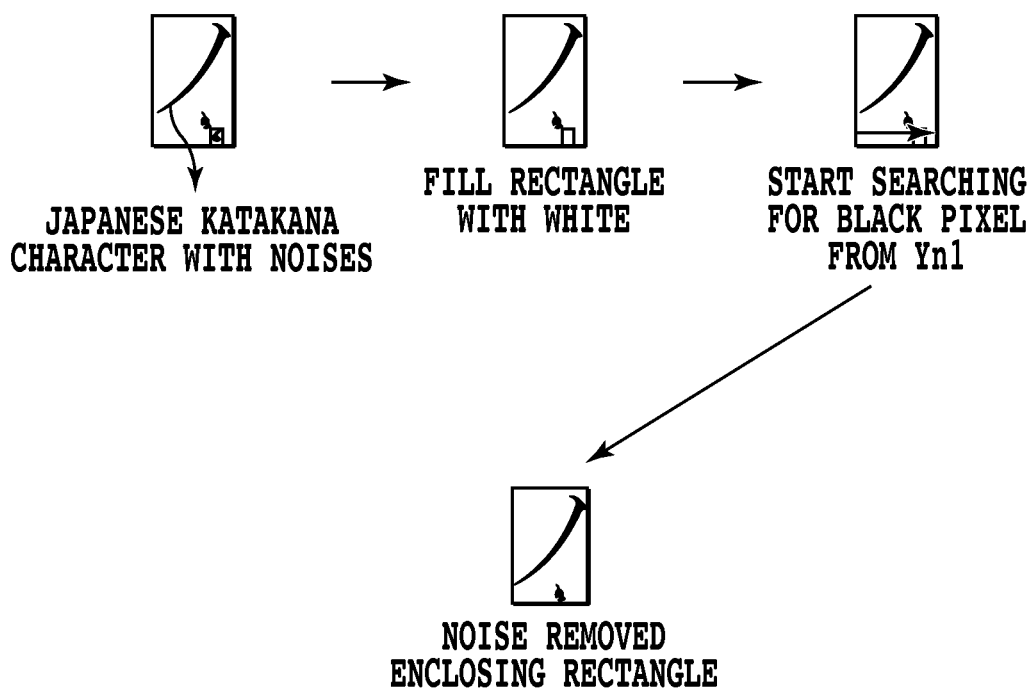
FIG. 8 is a diagram for explaining an enclosing border updated by performing noise removal in the embodiment in accordance with the present invention.

As shown in FIG. 8, by filling the noise rectangle with white pixels, a noise removed image is generated anew, and the border noise determination processing is continued after updating the enclosing border. In the present embodiment, since the Y coordinate of the rectangle from which the noise is removed is Yn1, the black pixel search is performed downward from the position of the Y coordinate Yn1. Then, the Y coordinate position at which the black pixel cannot be found is made the position of the lower side of the new enclosing rectangle. The foregoing processing retains the enclosing rectangle with the lower side having its position updated as the enclosing rectangle after removing noise.

In the foregoing processing, if a black pixel is found on the upper side, for example, the black pixel search is started from the Y coordinate of the noise rectangle, and the Y coordinate position at which a black pixel appears is made the upper side of the new enclosing rectangle. Likewise, if a black pixel is found on the right side, the black pixel search is started from the X coordinate of the noise rectangle, and the X coordinate position at which a black pixel disappears is made the right side of the new enclosing rectangle. Likewise, if a black pixel is found on the left side, the black pixel search is started from the X coordinate of the noise rectangle, and the X coordinate position at which a black pixel appears is made the left side of the new enclosing rectangle.

After removing noise and updating the enclosing rectangle, the processing returns to steps S303-S304 and continues the noise determination processing. Since the noise 1 has been found at the lower side, the black pixel search on the enclosing border is started from the left side. If the enclosing rectangle is unchanged, since noise is likely to be present at other locations on the first enclosing border, the search of the lower side of the enclosing border is continued.

Figure 9:
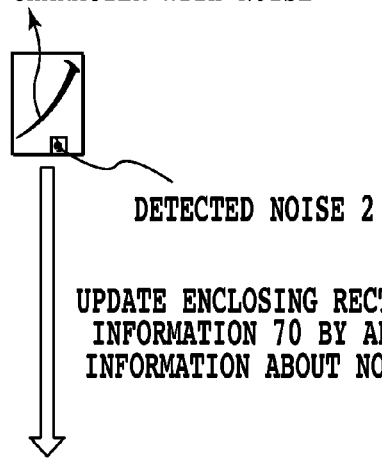
FIG. 9 is a diagram for explaining a black pixel search 2 about the character rectangle information α in the embodiment in accordance with the present invention.

In the example of FIG. 8, noise is not found on the upper side, right side or left side of the enclosing border, but is found on the lower side. Thus, as for the image from which the noise has been removed once, the border noise determination is further made on the lower side. Then, as shown in FIG. 9, noise 2 is output to be stored at step S305 as noise rectangle information, and the noise is removed at step S306, and the enclosing rectangle is updated. At this point of time, to the updated rectangle information 70 is added the information about the noise 2 detected by the black pixel search 2 shown in FIG. 9 (the X coordinate (Xn2), Y coordinate (Yn2), rectangle width (Wn2), rectangle height (Wh2), and the side contacting the noise rectangle (lower side) of the rectangle).

The foregoing processing is continued until no noise rectangle is found on any sides in the determination at step S304.

Figure 10:
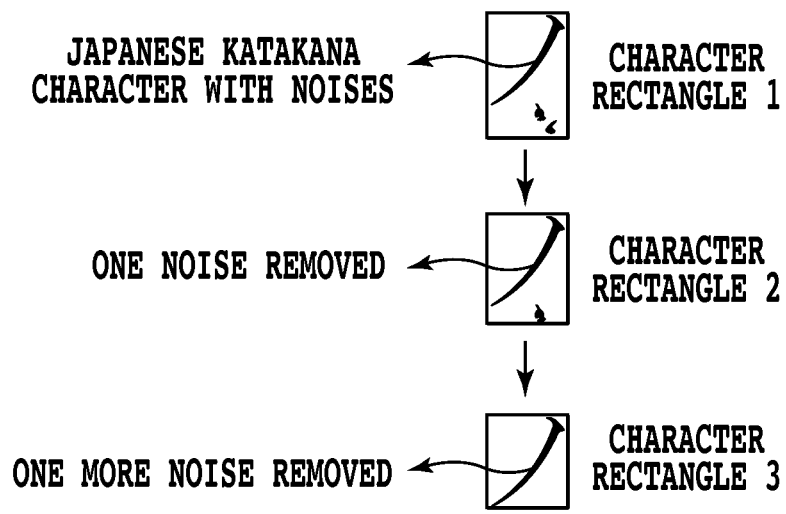
FIG. 10 is a diagram for explaining character rectangle pattern generation after noise removal in the embodiment in accordance with the present invention.

When it is determined at step S304 that there is no noise on any sides on the enclosing border, as shown in FIG. 10, all the patterns beginning from the original character image to the pattern from which the border noise is removed are generated at step S306. Thus, the original character rectangle 1, and the character rectangle 2 and character rectangle 3, which are noise candidate removed character rectangles, are generated.

At step S307, finalizing processing of the character rectangle is performed. More specifically, it performs character recognition processing on all the foregoing patterns, assesses the validity of the character recognition result, and selects the character rectangle with the highest validity to output a recognition result of the selected character rectangle. As information necessary for the validity assessment for finalizing the character rectangle, the present embodiment includes the character reliability (the degree of similarity), height of the character rectangle, width of the character rectangle, height of an average character and width of the average character. Using the information, the assessment is performed, and the character rectangle exhibiting the greatest validity is selected.

Figure 11:
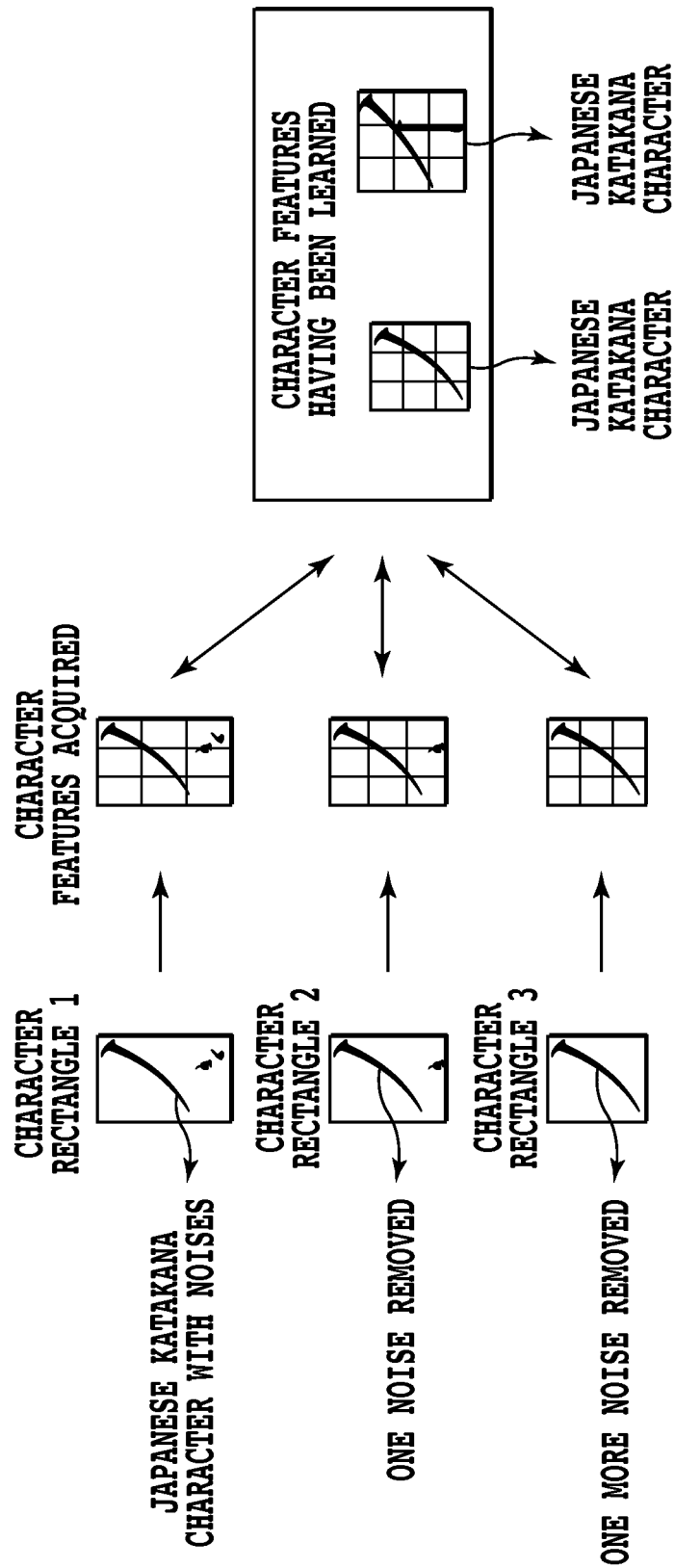
FIG. 11 is a diagram for explaining character recognition processing in the embodiment in accordance with the present invention.
Figure 13:
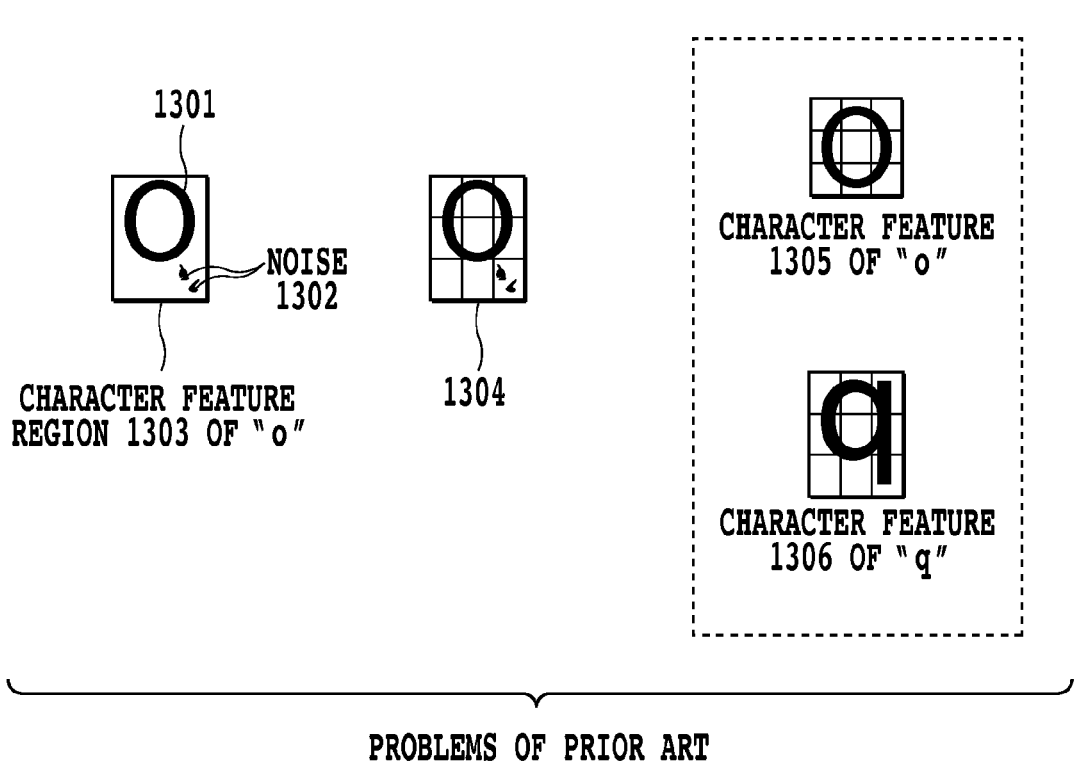
FIG. 13 is a diagram for explaining a problem for an alphabet character image in a conventional technique.

As for the character reliability among them, the reliability at the time of executing the character recognition processing is utilized. As for the character recognition processing, its outline will be described with reference to FIG. 11.

The enclosing rectangle of the character is acquired, and the character rectangles are divided into n×m. In the present embodiment, the character rectangles 1, 2 and 3 are divided into 3×3 each, and black pixel distribution directions (directions of edges (vertical, horizontal or diagonal)) in the individual divided partial images are obtained as features.

The character features obtained as described above are compared with character features learned in advance (that is, character features stored in the character recognition dictionary). Thus, a character code with the closest features and the degree of similarity thereof (the degree of recognition similarity) serving as reliability are output.

As for the character rectangle 1, it is determined that the features are closest to the features of a katakana character "イ". As for the character rectangle 2, it is determined that the features are closest to the features of the katakana character "イ", as well. As for the character rectangle 3, it is determined that the features are closest to the features of a katakana character "ノ". As the character recognition results concerning the character rectangles, the information items as shown in FIG. 12 are obtained. Incidentally, the average width and average height are averages of a plurality of character rectangles obtained from the line region.

From the information items, it is determined as to which one of the character rectangles has the greatest validity and the rectangle considered to have the greatest validity is selected. Thus, the rectangle is determined as a final result. The validity determination is made according to equations of a rectangle correction value and of the validity shown by the following expressions. The rectangle correction value is used for analyzing the shape of the character rectangle.

Rectangle Correction Value=((character width−average character width)/average character width)$^2$+((character height−average character height)/average character height )$^2$ Validity=(1−rectangle correction value)×reliability As for the character rectangle 1, the rectangle correction value is obtained from a difference (30−45) between the character width of the character rectangle and the average character width equal to the standard character width, and from a difference (65−45) between the character height and the average character height equal to the standard character height, and the validity is obtained from the rectangle correction value obtained and the reliability 90.

Rectangle Correction Value of Character Rectangle 1=((30−45)/45)$^2$+((65−45)/45)$^2$=0.309

Validity of Character Rectangle 1=(1−0.309)×90=62.2

As for the character rectangle 2, the rectangle correction value and validity are obtained in the same manner.

Rectangle Correction Value of Character Rectangle 2=((30−45)/45)$^2$+((50−45)/45)$^2$=0.123

Validity of Character Rectangle 2=(1−0.123)×60=52.6

As for the character rectangle 3, the rectangle correction value and validity are obtained in the same manner.

Rectangle Correction Value of Character Rectangle 3=((30−45)/45)$^2$+((40−45)/45)$^2$=0.123

Validity of Character Rectangle 3=(1−0.123)×90=78.9

Here, the character rectangle 3 with the greatest validity is selected and a recognition result of the selected character rectangle 3 is outputted.

Extracting the character rectangle that is selected in this manner makes it possible to remove noise accurately and quickly and to acquire the enclosing rectangle of characters correctly, thereby being able to improve the accuracy (character recognition accuracy) of the postprocessing of the character rectangle extraction. In addition, since the black pixel detection of noise is performed by scanning the enclosing border as a target, the amount of text processing can be reduced as compared with the case of scanning the entire region, and the processing speed increases.

(Other Embodiment in Accordance with Present Invention)

A processing method that reads a computer program stored in a storage medium as code and execute the program in a computer also falls within the category of the foregoing embodiment. In addition, not only the storage medium that stores the foregoing computer program, but also the computer program itself also falls within the scope of the foregoing embodiment.

Moreover, it is noted that the present invention is never limited to a device which is realized by a general purpose computer executing a computer program. The device according to the present invention might be realized using a hard ware (an electronic circuitry such as an ASIC) which is configured to perform the processing in the above embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-177907, filed Jul. 8, 2008, which is hereby incorporated by reference herein in its entirety.

What is claimed is:

1. An image processing device for processing a character rectangle extracted from an image, comprising:
    an acquiring unit configured to acquire a pixel block, which lies within the character rectangle in contact with an enclosing border of the character rectangle by scanning along the enclosing border, wherein a pixel block not in contact with the enclosing border is not acquired;
    a determination unit configured to determine whether or not the acquired pixel block has a likelihood of noise;
    a generating unit configured to generate a noise candidate removed character rectangle by removing from the character rectangle the pixel block when it is determined that the pixel block has the likelihood of noise; and
    an outputting unit configured to assess validities of both the noise candidate removed character rectangle and the character rectangle by performing character recognition, compare the two validities, and output a character recognition result based on the comparison result,
    wherein said outputting unit
        obtains degrees of recognition similarity of the character recognition performed for both the noise candidate removed character rectangle and the character rectangle,
        assesses the validities based on (i) the degrees of recognition similarity, (ii) a character width of the noise candidate removed character rectangle, (iii) a character height of the noise candidate removed character rectangle, (iv) a character width of the character rectangle, and (v) a character height of the character rectangle, and
        outputs the character recognition result for one the noise candidate removed character rectangle and the character rectangle with a greater validity.

2. The image processing device as claimed in claim 1, wherein said outputting unit
    obtains the degrees of recognition similarity of the character recognition performed for both the noise candidate removed character rectangle and the character rectangle,
    obtains correction values based on (i) a character width of the noise candidate removed character rectangle, (ii) a character height of the noise candidate removed character rectangle, (iii) a character width of the character rectangle, and (iv) a character height of the character rectangle,
    assesses the validities based on the degrees of recognition similarity and the correction values, and
    outputs the recognition result for one the noise candidate removed character rectangle and the character rectangle with a greater validity.

3. A method for controlling an image processing device for processing a character rectangle extracted from an image, said method comprising the steps of:

acquiring a pixel block, which lies within the character rectangle in contact with an enclosing border of the character rectangle, by scanning along the enclosing border, wherein a pixel block not in contact with the enclosing border is not acquired;

determining whether or not the acquired pixel block has a likelihood of noise;

generating a noise candidate removed character rectangle by removing from the character rectangle the pixel block when it is determined that the pixel block has the likelihood of noise; and assessing validities of both the noise candidate removed character rectangle and the character rectangle by performing character recognition, comparing the two validities, and outputting a character recognition result based on the comparison result, wherein said assessing, comparing and outputting step includes obtaining degrees of recognition similarity of the character recognition performed for both the noise candidate removed character rectangle and the character rectangle, assessing the validities based on (i) the degrees of recognition similarity, (ii) a character width of the noise candidate removed character rectangle, (iii) a character height of the noise candidate removed character rectangle, (iv) a character width of the character rectangle, and (v) a character height of the character rectangle, and outputting the character recognition result for one the noise candidate removed character rectangle and the character rectangle with a greater validity, and wherein at least some of said steps are performed using a computer.

4. A non-transitory computer-readable medium storing a computer program for causing a computer to execute a method of processing a character rectangle extracted from an image, the method comprising the steps of:

acquiring a pixel block, which lies within the character rectangle in contact with an enclosing border of the character rectangle, by scanning along the enclosing border, wherein a pixel block not in contact with the enclosing border is not acquired;

determining whether or not the acquired pixel block has a likelihood of noise;

generating a noise candidate removed character rectangle by removing from the character rectangle the pixel block when it is determined that the pixel block has the likelihood of noise; and assessing validities of both the noise candidate removed character rectangle and the character rectangle by performing character recognition, comparing the two validities, and outputting a character recognition result based on the comparison result, wherein said assessing, comparing and outputting step includes obtaining degrees of recognition similarity of the character recognition performed for both the noise candidate removed character rectangle and the character rectangle, assessing the validities based on (i) the degrees of recognition similarity, (ii) a character width of the noise candidate removed character rectangle, (iii) a character height of the noise candidate removed character rectangle, (iv) a character width of the character rectangle, and (v) a character height of the character rectangle, and outputting the character recognition result for one the noise candidate removed character rectangle and the character rectangle with a greater validity.

* * * * *